United States Patent [19]
Booij et al.

[11] Patent Number: 5,840,773
[45] Date of Patent: Nov. 24, 1998

[54] PROCESS FOR RECOVERING AND RECYCLING POLYAMIDE FROM CARPET WASTE

[75] Inventors: Martin Booij, Munstergeleen; Jan A.J. Hendrix, Obbicht; Yvonne H. Frentzen, Venlo; Nicolaas M.H. Beckers, Cadier en Keer, all of Netherlands

[73] Assignee: DSM N.V., Heerlen, Netherlands

[21] Appl. No.: 701,612

[22] Filed: Aug. 22, 1996

[30] Foreign Application Priority Data

Aug. 23, 1995 [BE] Belgium ................................ 09500704

[51] Int. Cl.⁶ ..................................................... C08J 11/04
[52] U.S. Cl. .......................... 521/49; 521/49.5; 521/49.8; 528/481; 528/495; 528/499
[58] Field of Search ........................... 521/49, 49.5, 49.8; 528/481, 495, 499

[56] References Cited

U.S. PATENT DOCUMENTS

| | | | |
|---|---|---|---|
| 2,742,440 | 4/1956 | Scott et al. | 260/2.3 |
| 3,696,058 | 10/1972 | Teti | 260/2.3 |
| 4,146,704 | 3/1979 | Seki | 528/323 |
| 5,280,105 | 1/1994 | Moran, Jr. | 528/486 |
| 5,430,068 | 7/1995 | Subramanian | 521/40 |

FOREIGN PATENT DOCUMENTS

| | | |
|---|---|---|
| 603434 | 6/1994 | European Pat. Off. |
| 1347566 | 11/1963 | France . |
| 7994 | 10/1954 | Germany . |
| 52-107047 | 9/1977 | Japan . |

OTHER PUBLICATIONS

37–Plastics Fabr., Uses, Chemical Abstract No. 90675, vol. 88, No. 14, Apr. 3, 1978, pp.45–46.

*Primary Examiner*—Vasu Jagannathan
*Assistant Examiner*—Olga Asinovsky
*Attorney, Agent, or Firm*—Pillsbury Madison & Sutro LLP

[57] ABSTRACT

The present invention relates to a process for treating polyamide-containing carpet waste by extracting the polyamide from the carpet waste with an extraction agent containing an aliphatic alcohol. The separated polyamide can then be recovered from the extract and recycled for further use. In addition, carpet waste containing two polyamides can be treated in accordance with the present invention so as to separately recover each polyamide. The process according to the present invention provides a high yield of the polyamide. The presence of other constituents normally present in carpets does not interfere with the separating and recycling of the polyamide.

17 Claims, 1 Drawing Sheet

5,840,773

PROCESS FOR RECOVERING AND RECYCLING POLYAMIDE FROM CARPET WASTE

BACKGROUND OF THE INVENTION

1. Field of the Invention

The present invention relates generally to a process for recycling polymers from carpet waste. In particular, the present invention is directed to a method for removing a polyamide from carpet waste with an extract agent, and then recovering the polyamide from the extracted solution.

2. Description of the Related Art

Due to increasing concerns over preserving natural resources and protecting the environment, there have been greater efforts directed toward recovering discarded products and recycling them for future use. One such product that has been targeted for recycling is carpet, and, in particular, the large amounts of polyamides contained in many common carpets.

Carpet waste usually contains large portions of polymers. In particular, such waste often has a high polyamide content. Attempts have been made to recover and recycle polyamide from carpet waste in order to minimize the portion of the polyamide-containing carpet waste that has to be discarded.

One such conventional process is disclosed in European Patent Application (EPA) 603434, which describes the separation of polyamide from carpet waste by dissolving the polyamide-containing carpet in a solvent. In particular, EPA 603434 identifies suitable solvents as concentrated inorganic acids, formic acid, chloroacetic acid, phenols, cresols, alcoholic solutions of alkaline earth halides, aromatic alcohols such as phenylethanol and benzyl alcohol, as well as glycols, lactams and lactones.

However, it has been discovered that the extraction agents used in the above-mentioned conventional process can create several problems when practiced on certain common carpets. For example, the carpets discussed in EPA 603434 do not contain adhesive or calcium carbonate compounds, which are commonly found in carpets. It is believed that EPA 603434 omits any mention of practicing its extraction agents on carpets containing adhesive or calcium carbonate compounds because some of these extraction agents (such as the concentrated inorganic acids) are acidic and react with calcium carbonate, which is often present in the backing layer of carpets. In addition, other extraction agents mentioned (such as aromatic alcohols, phenols and cresols) produce highly viscous polyamide solutions when introduced to the spent carpets. Still other of these conventional agents (such as alcoholic solutions of alkaline earth halides) are corrosive and, therefore, impede the ability to recycle the polyamide.

Furthermore, the extraction agents discussed in the above-mentioned conventional process are not suitable for treating carpets containing other polymers, such as rubbers and polyvinyl chloride, which also dissolve in some of the extraction agents and, therefore, cannot be easily separated. A further shortcoming of this known process is that extraction agent residues are often left behind in the recycled polyamide. Therefore, the quality of the polyamides recovered is substantially reduced.

In this regard, as referred to herein, "carpet waste" denotes more than the polyamide fiber component of a carpet containing minor impurities. Rather, carpet waste shall include spent carpet material containing carpet components other than polyamide(s), such as the carpet backings, adhesives, and/or calcium carbonate compounds, etc. Carpet waste includes, but is not limited to, defective carpet formed during the production of polymer-containing carpets, and especially polyamide-containing carpets, as well as old, spent, and/or discarded carpets.

Other conventional processes relate to the preparation of polyamides from nylon production scrap, and discuss the separation of such nylon production scrap from minor impurities contained therein, such as dirt, oil, or grease. Unlike the present invention, these processes, such as those disclosed in U.S. Pat. No. 2,742,440 to Stott et al. and U.S. Pat. No. 4,146,704 to Seki et al., are unrelated to recovering polymers, such as polyamide, from carpet waste.

SUMMARY OF THE INVENTION

It is therefore an object of the present invention to solve the aforementioned problems associated with the prior art as well as other problems by providing a process for extracting and recycling polymers, and, in particular, polyamide, from carpet waste.

It is another object of the present invention to provide a method which recovers polyamide from carpet waste at a high yield.

It is a further object of the present invention to provide a method for recovering polyamide from carpet waste that can be practiced with a wide variety of carpets, including carpets containing rubbers and adhesives.

It is still a further object of the present invention to provide a method for separately recovering polyamides from carpet waste that contains a plurality of different polyamides.

To accomplish these objectives, an embodiment of the present invention provides a method for treating polyamide-containing carpet waste that involves combining carpet waste containing at least one polyamide with an extraction agent comprising an aliphatic alcohol. After the polyamide dissolves in the extraction agent to form an extraction solution, the extraction solution containing the at least one polyamide is separated from the insolubles.

According to a further embodiment of the present invention, the extraction agent is an alcoholic solution that contains an aliphatic alcohol and that is substantially free of an alkaline earth halide so as to avoid undesirable amounts of corrosion.

According to another embodiment of the present invention, carpet waste containing at least first and second polyamides are introduced to an extraction agent comprising an aliphatic alcohol to form an extraction solution. The two polyamides are separately recovered from the extraction solution by controlled lowering of the temperature.

According to yet another embodiment of the present invention, polyamide can be separated and recovered from carpet waste that contains color dyes. Preferably, the polyamides are separated from the color dyes by controlled lowering of the temperature.

These embodiments provide several advantages over conventional techniques. It has been found that the present invention can suitable be practiced on carpets containing rubber and adhesives, which are present in many common carpets, while not interfering with the recovery of the polyamide. For example, the present invention can suitably be practiced on carpets containing components such as polypropylene, rubbers, jute, polyurethanes, polyvinyl chloride, acrylate, (meth)acrylate copolymers, and polyethylene terephthalate, etc. It has further been found that in practicing the present invention, polyamides can be separated from these other components of carpet waste in a highly selective manner. It has also been found that virtually no polyamide is decomposed during this extraction step of the present invention. As a result, directly reusable polyamides can be isolated in the present process in relatively few steps and at a higher yield.

These and other objects, features, and advantages of the present invention will become apparent from the following detailed description when taken in conjunction with the accompanying drawing which illustrates, by way of example, the principles of the present invention.

BRIEF DESCRIPTION OF THE DRAWING

The accompanying drawing illustrates an example of a polyamide-containing carpet on which the present invention can be practiced.

DESCRIPTION OF THE PREFERRED EMBODIMENTS

Figure 1:
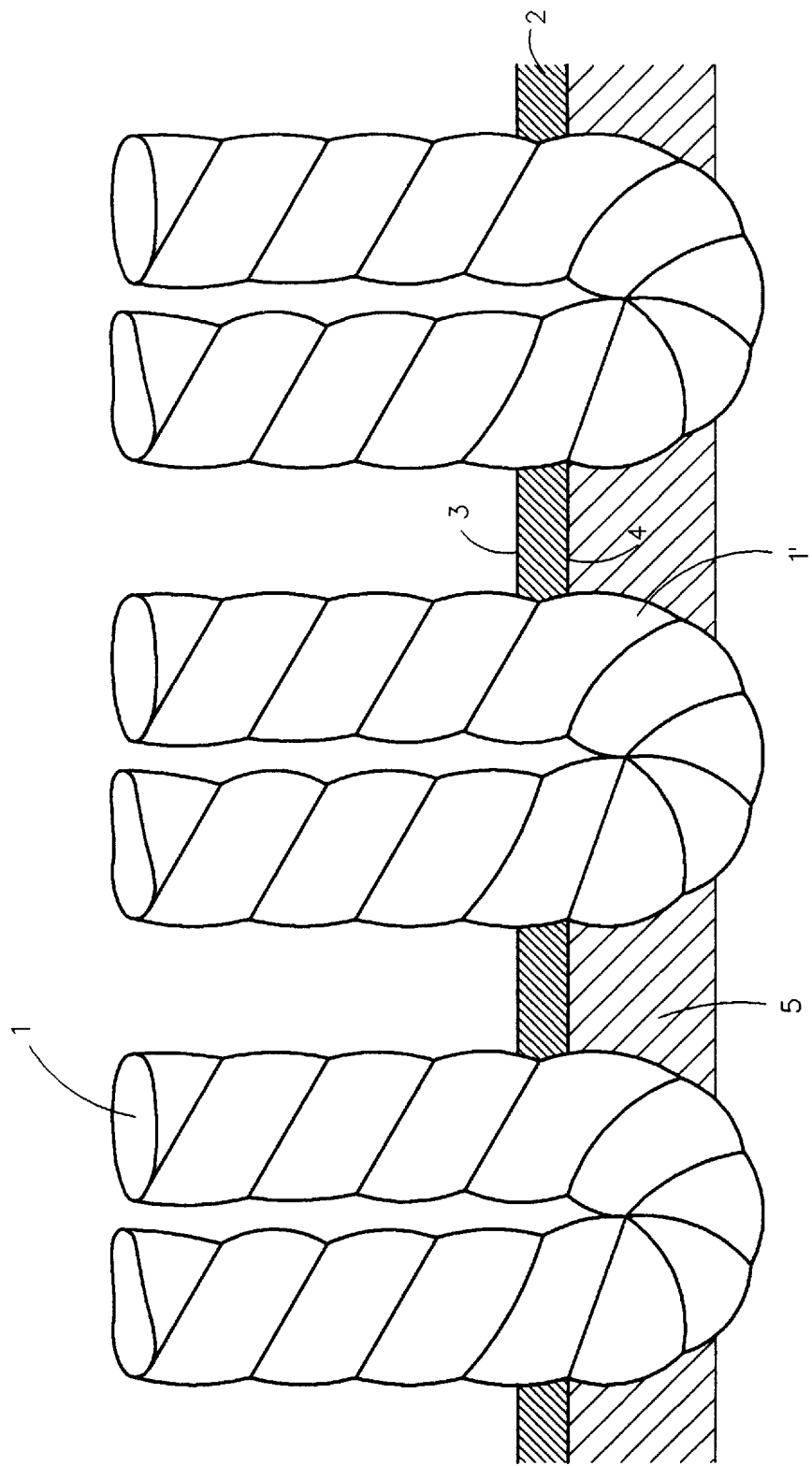

Polyamide carpets generally have the structure shown in the accompanying FIGURE. Polyamide-containing pile threads (1) are looped through a woven backing layer (2), which can be made, for example, of a fabric of polypropylene fibers. The pile threads are adhered to the reverse side (4) of the backing with an adhesive (5), such as, for example, a styrene-butadiene-rubber latex. The adhesive forms a very firm bond between the pile threads and the backing.

Notwithstanding the strength of this arrangement, by practicing the process of the present invention the polyamide can be separated from the pile threads in the carpet waste with unexpected ease and efficiency, as well as at an unexpectedly high yield.

Polyamides that can be recycled in accordance with the process of the present invention include most polyamides that are frequently found in carpets, such as, for example, polyamide-6 (PA-6), polyamide-6,6 (PA-6,6), and mixtures thereof; also, lesser found polyamides such as, for example, polyamide-4,6 (PA-4,6), polyamide-12 (PA-12), and the like, as well as mixtures thereof, can be recycled by the present invention.

In accordance with one embodiment of the present invention, an aliphatic alcohol which dissolves the polyamide to be recycled can be employed as the extraction agent. Exemplary alcohols include methanol, ethanol, n-propanol, isopropanol, n-butanol, isobutanol, tert-butanol, pentanol, hexanol, 2-ethylbutanol, 4-methylpentanol, 1-heptanol, 2-heptanol, 4-heptanol, 2,4-dimethylpentanol, 1-octanol, 2-octanol, 2-ethylhexanol, 1-nonanol, 2-nonanol, n-decanol, n-undecanol, n-dodecanol, n-tridecanol, n-tetradecanol, n-pentadecanol, n-hexadecanol, n-octadecanol, and the like.

Substituted monohydric and dihydric alcohols, such as 2-methoxy-1-ethanol (methylene glycol), can also be used. In a preferred embodiment of the present invention, $C_1$–$C_{12}$ alcohols are employed. For example, methanol or ethanol is preferably employed as the extraction agent. These extraction agents are inexpensive and readily available. Methanol is particularly suitable, because it has a low boiling point. Accordingly, traces of the methanol that are present in the extracted polyamide end product can be easily eliminated by evaporation.

According to another embodiment of the present invention, mixtures of aliphatic alcohols can also be used as extraction agents. Furthermore, in accordance with yet another embodiment of the present invention, mixtures of water and one or more aliphatic alcohols can also be employed as extraction agents. It is advantageous to use a mixture of methanol and water with a methanol/water molar ratio higher than about 1:1. This extraction agent permits an efficient separation of the polyamide and is inexpensive.

However, the alcohol extraction agent is preferably substantially free of an alkaline earth halide so as to avoid undesirable amounts of corrosion to the equipment employed.

The extraction is preferably carried out at a temperature and pressure at which the polyamide readily dissolves in the extraction agent. The temperature used for the extraction is preferably not so high, however, as to cause degradation of the polyamide. For example, if methanol is elected as the extraction agent and the polyamide to be recycled is polyamide-6, the extraction is preferably carried out at about 110° C. to about 150° C., and more preferably at about 135° C. to about 140° C. If methanol is selected as the extraction agent and polyamide-6,6 as the polyamide to be recycled, however, a higher extraction temperature should be employed, preferably about 140° C. to about 180° C., and more preferably 155° C. to about 165° C.

In accordance with a further embodiment of the present invention, a carpet containing a plurality of polyamides can be treated to individually extract the polyamides. For example, a carpet sample containing both polyamide-6,6 and polyamide-6 can be subjected to a two-stage treatment procedure to separately extract these polymers. For example, it has been discovered that polyamide-6,6 is insoluble (or virtually insoluble) in methanol at 135° C., while polyamide-6 is readily soluble in this extraction agent at 135° C. Accordingly, the extraction in the first stage is preferably conducted at about 110° C. to about 150° C., and more preferably at about 135° C. to about 140° C., to dissolve and extract the polyamide-6, which is soluble in methanol at this temperature. After the separation of the first extraction solution from the insolubles, the polyamide-6 can then be recovered from the first extraction solution. Next, the second stage of extraction is preferably conducted at about 140° C. to about 180° C., and more preferably at about 155° C. to about 165° C. to dissolve and extract the polyamide-6,6. After the separation of the second extraction solution from the insolubles, the polyamide-6,6 can then be recovered from the second extraction solution.

Alternatively, according to still a further embodiment of the present invention, both the polyamide-6 and polyamide-6,6 can be extracted from the carpet at about 140° C. to about 180° C. with methanol. Thereafter, the two polyamides are separately recovered from this joint extract by controlled cooling. Polyamide-6,6 will precipitate out first and can be separated off, followed by the polyamide-6 fraction, which will precipitate out at a lower temperature.

In accordance with a further embodiment of the present invention, controlled cooling can be practiced to separate polyamides from dyes that are present in colored carpet waste. Many dyes dissolve in the extraction agent and, therefore, also can be extracted with the polyamides during the extraction stage. These dyes remain in solution when the extract is cooled to a temperature at which the polyamide is no longer soluble in the extraction agent, such as, for example, about 25° C. The polyamide can subsequently be removed from the solution. These dyes can then be separated from the extraction agent in a known way. For example, the dye can be separated by partially or completely evaporating the extractant agent or by adding a liquid that causes the dye to precipitate. The dye can also be separated by extraction with a solvent in which the dye is soluble and the extraction agent is insoluble or only slightly soluble. The dye can also be separated from the extraction agent with the aid of an absorbent such as active carbon.

The pressure employed for the extraction is not critical. The extraction is preferably carried out at an elevated pressure. The minimum pressure used depends on the vapor pressure of the extraction agent at the temperature of the extraction. If methanol is used as the extraction agent, the preferred pressure during the extraction is about 0.2 MPa to about 2 MPa (gauge), and more preferably about 0.5 MPa to about 1.5 MPa. It is particularly advantageous to select a pressure that is the same as the vapor pressure of the extraction agent at the temperature of the extraction. The pressure need not be controlled separately in such a case.

The carpet waste, which is often delivered in the form of rolls or bales of carpet, is preferably comminuted before the extraction. The carpet waste can be comminuted by a known method, such as by cutting or grinding. The resulting carpet fragments can be easily fed into a vessel in which the extraction takes place and in which the carpet fragments are thoroughly mixed with the extraction agent. These fragments preferably measure about 0.5 $cm^2$ to about 20 $cm^2$, and more preferably about 2 $cm^2$ to about 8 $cm^2$. A suitable size of the fragments makes for a good extraction and ensures that the residual pieces (for example, the backing) are not so small after extraction as to hamper their separation from the extract.

The vessel used for the extraction can have any desirable form, such as a column, tank, or tube, and is preferably an autoclave. The carpet fragments are preferably mixed with the extraction agent with, for example, the aid of a stirrer placed in the extraction vessel.

The ratio between the amount of extraction agent and the amount of the carpet waste is preferably selected in such a manner as to take into account the amount of polyamide in the carpet waste and other factors, such as the size of the fragments of carpet waste. The amount of extraction agent is preferably not so great as to provide the solution with an undesirably high viscosity during the extraction when all the polyamide has been dissolved. Further, the amount of extraction agent is preferably minimized in order to lessen the amount of extraction agent to be recovered. The optimum ratio between the extraction agent and the carpet waste depends upon the type of carpet waste and extraction agents selected and can be ascertained by routine experimentation. In the case of polyamide-6 carpet waste containing about 30 wt % of polyamide-6 and a methanol extraction agent, a suitable ratio by weight between the alcohol and the carpet waste is from about 5 to about 50, preferably from about 5 to about 20.

The time needed for extraction can also be easily determined by routine experimentation. The time allowed for extraction should preferably take into account the type and amount of polyamide that is present in the carpet waste, the concentration of the polyamide in the extraction agent, the extraction agent, the temperature of extraction, and the degree of mixing effected in the extraction vessel. An extraction time of 60 min has been found to be suitable for a solution of a methanol extraction agent and polyamide-6, with the extraction preferably being carried out in an autoclave at a temperature of about 135° C. to about 140° C.

After the extraction, the extract is preferably separated from the solids in the extraction vessel. This can be achieved, for example, with any suitable solid/liquid separating device, such as a settling tank (sedimentation), a hydrocyclone, a centrifuge, or a filter. This separation is preferably conducted above the temperature at which the polyamide precipitates out of the extract. More specifically, it is preferably done above about 90° C., and more preferably above about 110° C. These solids that do not dissolve in the extraction agent generally include numerous components of the polyamide-containing carpet waste, such as jute, polypropylene, fillers (e.g., calcium carbonate), rubber (e.g., styrene-butadiene rubber), polyurethane, polyvinyl chloride, acrylate or methacrylate copolymers (e.g., copolymers of acrylonitrile and acrylate or methacrylate esters), wool, and polyesters (e.g., polyethylene terephthalate).

The extract, which is preferably an alcoholic solution of polyamide, can be directly processed further as such. It is also possible to remove the polyamide from the extraction agent by, for example, first precipitating the polyamide and then separating the precipitated polyamide by a conventional method such as filtration. The polyamide can be precipitated either by adding an appropriate liquid, or by cooling the polyamide solution. The preferred way of separating the polyamide from the extraction agent is to cool the extract, so that the extraction agent can then be directly returned into the process. The shape of the precipitated polyamide particles can be controlled by varying the rate of cooling of the extract. Although the methods of separation discussed above are preferred here, any other known method, such as evaporation, can be similarly used to separate the extraction agent from the polyamide. The polyamide can be separated either as a solid or as a melt. In the case of a melt, the melt is then preferably processed further in an extruder and pelletized.

The extraction agent is preferably recovered and returned into the process after the polyamide has been separated. If the extraction agent is separated from the polyamide by evaporation, it easily can be recovered by condensation, after which it is returned into the process. If the separation has been effected by cooling, the extraction agent can be returned to the extraction stage after warming, if desired. If a liquid that does not dissolve polyamides has been added, this liquid is preferably separated from the extraction agent by, for example, distillation, after which both the extraction agent and the non-solvent can be returned into the process.

The recycled polyamides obtained in the process according to the present invention are free or nearly free of any degradation. The relative viscosity (RV) of the recycled polyamides is generally at least 85% of the relative viscosity of the polyamide present in the original carpet waste. This percentage, referred to herein as RV retention, is preferably at least 90%. The relative viscosity is determined in a solution of 96% sulphuric acid, using a polyamide concentration of 1 g/dl, and is a measure of the weight-average molecular weight of the polyamide.

The recycled polyamide contains many if not all of the attributes of the newly processed polyamide, and can be further processed into polyamide products in the same way as newly processed polyamide. For example, the recycled polyamide is suitable for producing engineering plastics or raw materials for fibers. The recycled polyamide can also be mixed with new polyamide.

A process for treating carpet waste is disclosed in Application No. 9 500 704, filed in Belgium on Aug. 23, 1995, the complete disclosure of which is incorporated herein by reference.

The following non-limiting examples serve to explain embodiments of the present invention in more detail.

EXAMPLE I 75 g of waste carpet made of polyamide-6 (nylon 6) and comminuted to fragments measuring 4–6 $cm^2$ were placed in a 2-liter autoclave made of chromium-nickel steel and were stirred with 1125 ml of methanol at a temperature of 133° C. and at a self-generated pressure of about 0.9 MPa. The waste carpet was a normal polyamide-6 carpet having polyamide-6 pile and a backing layer comprising polypropylene fibers, styrene-butadiene rubber (SBR), and calcium carbonate. The carpet waste contained 31.1 wt % (or 23.325 g) of polyamide-6. After 1 hour, the contents of the autoclave were passed through a filter that had been heated to 135° C. The solid retained on the filter was collected and processed without any difficulty. The polypropylene fibers derived from the carpet were visibly intact and separate from the pulverized styrene-butadiene rubber and the calcium carbonate powder. The extract was concentrated and evaporated to dryness under vacuum in a Rotavapor apparatus. The filter cake and the solid left behind in the autoclave were also dried under vacuum. The residue remaining after evaporating the methanolic extract weighed 23.0 g, and 99.8 wt % of it was polyamide-6. The dried filter cake, weighing 51.0 g, only contained 0.2 wt % of polyamide-6.

The relative viscosity (RV) of the recycled polyamide was 2.40 dl/g, compared to a value of 2.61 dl/g for the polyamide originally present in the carpet waste. The relative viscosity was determined in a solution of 96% sulphuric acid, using a polyamide concentration of 1 g/dl. The retention of relative viscosity (RV retention) was therefore 92.0%.

EXAMPLE II

The process described in Example I was repeated with 75 g of comminuted waste carpet made of polyamide-6,6 (nylon 6,6), containing 35% of polyamide-6,6. Unlike Example I, the solid retained on the filter was, more or less, an entangled mass from which the fibers could not be easily collected and separated. The dry weight of this solid fraction was found to be 71.1 g. The residue remaining after the evaporation of the extract amounted to 3.0 g and mainly consisted of polyamide-6,6, which accounts for a low yield of about 11%. As illustrated by this example, extraction of polyamide-6,6 after dissolving the carpet waste at a temperature of only 133° C. can hinder the full benefits of the present invention from being realized. The polyamide-6,6 is preferably dissolved at a temperature of at least about 140° C.

EXAMPLE III

Four samples of nylon 6 carpet fibers, each of a different color, were obtained by picking the fibers from four nylon 6 carpets of different colors. 0.5 g of each sample was placed in a 60-ml Carius tube and mixed with 20 ml of methanol. The Carius tubes were then sealed and placed in an oven, where they were heated at 137° C. for 1.5 hours and swirled at regular intervals.

After cooling the tubes, the nylon 6 that had dissolved separated out as a white powder. The dye from the carpet fibers remained dissolved in the methanol during the extraction, even after the solution had been cooled to as low as 25° C.

EXAMPLE IV

The process described in Example III was repeated with four samples of nylon 6,6 carpets having different colors, and the Carius tubes were heated to 160° C. for 1.5 hours. The nylon 6,6 almost completely dissolved in the methanol at 160° C. The dissolved nylon 6,6 was then separated out as a white powder after cooling to 25° C.

Examples I–IV demonstrate that polyamide-6 can be extracted from carpet waste by the process according to the present invention. The Examples further demonstrate that, at the higher extraction temperature of about 160° C., polyamide-6,6 also can be extracted from carpet waste in accordance with the present process. Furthermore, polyamide can be efficiently separated from polypropylene, calcium carbonate, styrene-butadiene rubber, and acrylonitrile and methacrylate ester copolymers. Moreover, dyes can be separated from the polyamide. Finally, polyamide-6 and polyamide-6,6 can be separated selectively by the use of, for example, different extraction temperatures.

Although the present invention has been described in detail with reference to its presently preferred embodiments, it will be understood by those of ordinary skill in the art that various modifications and improvements to the present invention are believed to be apparent to one skilled in the art. Accordingly, no limitation upon the invention is intended, except as set forth in the appended claims.

What is claimed is:

1. A process for recovering at least one polyamide from a polyamide-containing carpet waste, said process comprising the steps of:

providing carpet waste containing at least one polyamide;

providing an extraction agent comprising at least one aliphatic alcohol and being substantially free of an alkaline earth halide;

combining the carpet waste and the extraction agent to form an extraction solution; and extracting the at least one polyamide from the extraction solution, wherein the at least one aliphatic alcohol is selected from the group consisting of methanol, ethanol, and propanol.

2. A process according to claim 1, wherein the at least one alcohol is methanol.

3. A process according to claim 1, wherein the extraction agent is a mixture of aliphatic alcohol and water.

4. A process according to claim 3, wherein the mixture of aliphatic alcohol to water has a weight ratio greater than 1:1.

5. A process according to claim 1, wherein the at least one polyamide is polyamide-6 and said extracting step is conducted at about 100° C. to about 150° C.

6. A process according to claim 2, wherein the at least one polyamide is polyamide-6 and said extracting step is conducted at about 100° C. to about 150° C.

7. A process according to claim 1, wherein the at least one polyamide is polyamide-6,6 and said extracting step is conducted at a temperature of about 140° C. to about 180° C.

8. A process according to claim 2, wherein the at least one polyamide is polyamide-6,6 and said extracting step is conducted at a temperature of about 140° C. to about 180° C.

9. A process according to claim 1, wherein the carpet waste further contains at least one dye, and wherein said process further comprises separating the at least one dye from the at least one polyamide at a temperature not less than about 25° C.

10. A process for recovering at least two polyamides from a polyamide-containing carpet waste, said process comprising the steps of:

providing carpet waste containing at least first and second polyamides;

providing an extraction agent comprising at least one aliphatic alcohol and being substantially free of an alkaline earth halide;

combining the carpet waste and the extraction agent;

extracting the first polyamide from the carpet waste by dissolving the first polyamide in the extraction agent at a first temperature to form a first extraction solution, the first temperature being selected such that the second polyamide is substantially immiscible in and not dissolved by the extraction agent at the first temperature;

recovering the first polyamide from the first extraction solution;

extracting the second polyamide from the carpet waste by dissolving the second polyamide in the extraction agent at a second temperature that is greater than the first temperature to form a second extraction solution; and recovering the second polyamide from the second extraction solution.

11. A process according to claim 10, wherein the first polyamide is polyamide-6 and the second polyamide is polyamide-6,6.

12. A process according to claim 11, wherein said step of extracting the first polyamide is conducted at about 110° C. to about 150° C. and said step of extracting the second polyamide is conducted at about 140° C. to about 180° C.

13. A process according to claim 10, wherein said step of extracting the first polyamide is conducted at about 135° C. to about 140° C. and said step of extracting the second polyamide is conducted at about 155° C. to about 165° C.

14. A process for recovering at least two polyamides from a polyamide-containing carpet waste, said process comprising the steps of:

providing carpet waste containing at least first and second polyamides;

providing an extraction agent comprising at least one aliphatic alcohol and being substantially free of an alkaline earth halide;

combining the carpet waste and the extraction agent to form an extraction solution in which the at least first and second polyamides are dissolved;

controlled cooling the extraction solution to a first temperature so as to precipitate out the first polyamide from the extraction solution;

recovering the first polyamide from the extraction solution;

controlled cooling the extraction solution to a second temperature so as to precipitate out the second polyamide from the extraction solution; and recovering the second polyamide from the extraction solution wherein at least one aliphatic alcohol is selected from the group consisting of methanol, ethanol, and propanol.

15. A process according to claim 14, wherein said first and second polyamides are polyamide-6,6 and polyamide-6, respectively.

16. A process according to claim 15, wherein the first temperature is about 140° C. to about 180° C., and the second temperature is about 110° C. to about 150° C.

17. A process according to claim 15, wherein the first temperature is about 155° C. to about 165° C. and the second temperature is about 135° C. to about 140° C.

* * * * *